Nov. 26, 1940.  F. HENTZEN  2,222,906
ELECTRIC WELDING APPARATUS
Filed Oct. 10, 1938
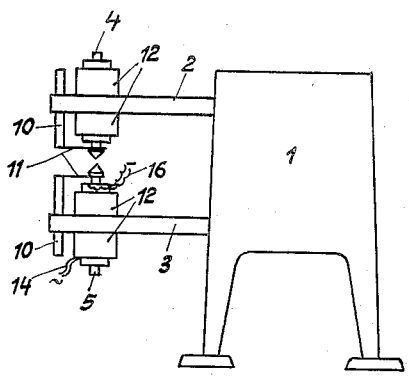
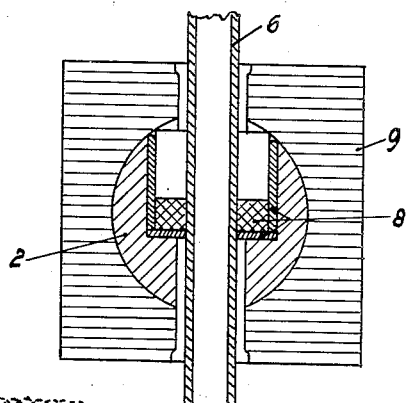
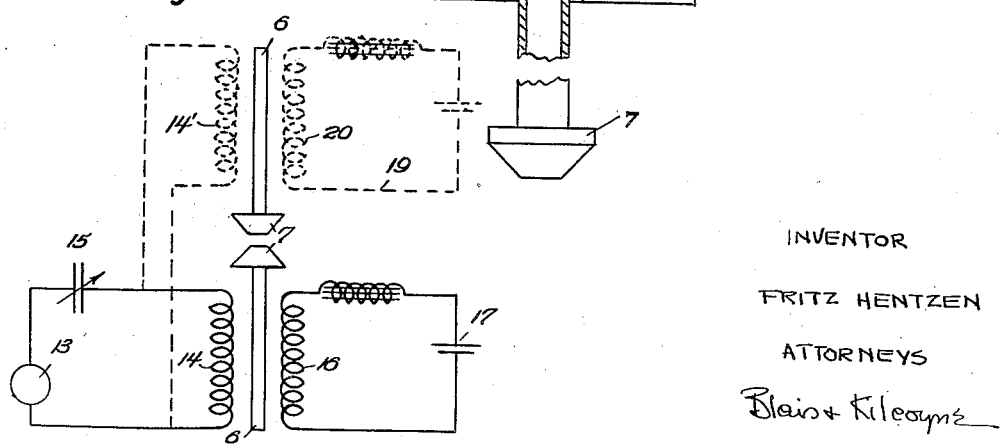
INVENTOR
FRITZ HENTZEN
ATTORNEYS
Blair & Kilcoyne Patented Nov. 26, 1940

2,222,906

UNITED STATES PATENT OFFICE 2,222,906

ELECTRIC WELDING APPARATUS

Fritz Hentzen, Augsburg, Germany, assignor to Messerschmitt Aktiengesellschaft, Augsburg, Germany, a company of Germany Application October 10, 1938, Serial No. 234,159
In Germany October 13, 1937

4 Claims. (Cl. 219—4)

The present invention relates to the electric resistance welding of metals, especially aluminum and its alloys.

The invention is based on the discovery that the structural properties of a spot or seam weld are considerably improved by a thorough mechanical treatment of the weld during the welding process proper and while the weld cools down. Heretofore in the art attempts have been made to apply during welding a vibrating pressure to the weld at the frequency of the welding current; this method has proved quite insufficient in so far as the welding time corresponds to about one single cycle and the mechanical treatment during the welding comprises therefore not more than one or two blows.

According to the present invention, the method of welding a plurality of work pieces consists in applying to said work pieces through a plurality of electrodes simultaneously an electric current and a vibratory mechanical pressure of constant amplitude the frequency of which corresponds at least to the higher range of audible frequencies. Consequently the compression stress in the material at the welding point will vary, during the welding process, many times between suitably chosen limits. Alternatively the vibrating pressure superimposed with respect to the steady electrode pressure may, depending on the phase displacement between the vibrations of both electrodes, exert an oscillating bending moment upon the material, or a combination of oscillating bending and oscillating compression.

The apparatus for carrying the invention into effect consists of a spot welder or seam welder of known type and one or more sound or ultra-sound transmitters, the frequency of which corresponds at least to the higher range of audible frequency, each of these transmitters surrounding one of said electrodes. It is thus attained by the invention that the sound or ultra-sound is transmitted direct through the electrode itself. In order to avoid disturbances of the sound transmitter, as might be caused e. g., by excessive temperatures, it is also proposed according to the invention to separate the supply of current from the sound transmitter. In this case it may be said that current and sound are only combined at the extreme end of the electrode itself. It having been found that the improvement of the welded texture depends upon the intensity of sound acting during the welding operation, the invention further provides to arrange sound or ultra-sound transmitters bilaterally. According to the invention this is preferably done by providing each of the two electrodes with at least one sound transmitter.

In order that the present invention may be readily understood, a welding device adapted to carry it into effect is illustrated by way of example in the accompanying drawings, in which Fig. 1 is an elevation of a welding device adapted to carry out the method according to the invention, Fig. 2 shows in sectional elevation the arrangement of the welding electrode, Fig. 3 is a circuit diagram of the electrical arrangement by which oscillations of sound or ultra-sound frequency are produced and transmitted.

Referring now to the drawings, the arrangement to carry out the invention comprises a spot welding device of the usual type comprising a frame 1 in which the welding transformer is accommodated having laterally extending brackets 2 and 3; these brackets carry the electrodes 4 and 5 and at the same time serve for conducting the welding current. Each of the electrodes 4 and 5 comprises a nickel tube 6 (Figure 2) at one end of which the welding electrode proper 7 is secured, the latter being generally made of copper. The nickel tube 6 is secured in the associated bracket 2 or 3, which is provided with a suitable opening, in which an insulating member 8 is mounted. The supporting arrangement is surrounded by a member 9 of material known under the registered trade-mark "Ferrocoll" as shown in Fig. 2.

The current is supplied to the welding electrode proper 7 through the members 10 and 11, Fig. 1 of which the rigid parts 10 are connected with the associated electrode brackets 2 and 3 respectively, and the part 11 which is made of flexible copper cable or the like, is connected with the welding electrode proper 7 as shown. In the constructional example of the invention as illustrated both the nickel tubes 6 of the lower and upper electrodes are provided with arrangements 12 for transmitting sound or ultra-sound oscillations, and a circuit diagram of these arrangements is shown in Figure 3.

The sound emitter is constituted by a generator 13 producing alternating current of sound or ultra-sound frequency, which is connected in series with an oscillation circuit comprising an inductance 14 and an adjustable condenser 15. The coil 14 of the oscillation circuit is arranged coaxially with the associated nickel tube 6. Inside the coil 14 a pre-magnetising coil 16 is arranged, which is likewise disposed coaxially with respect to the associated nickel tube and is connected to a battery 17 through a choke coil 18.

In the illustrated example, in which both welding electrodes are provided with arrangements for transmitting sound or ultra-sound frequencies, the inductance of the oscillation circuit is divided in two coils 14 and 14', each of which is disposed coaxially with respect to the associated nickel tube. A second direct-current circuit 19 similar to the first direct-current circuit and comprising a magnetising coil 20 serves for pre-magnetising the second nickel tube.

The duplex arrangement of sound or ultra-sound transmitters offers another possibility of modifying the application of sound to the point where a welding connection is established. According to the invention it is possible by suitably controlling the application of sound, to apply sound of equal direction to the point from both sides, so that the oscillations applied from both sides are not only of the same frequency but also of no displacement in phase, with reference to a common fixed point. Accordingly the effect is such that e. g. at a predetermined moment from one side a pressure and from the other side a reduced pressure is applied to the point to be welded in addition to the electrode pressure. In other words, it means that the point to be welded is shaken to and from or up and down in the rhythm of oscillations.

It has also been found to be particularly advantageous to operate the sound transmitters of the two sides at the same frequency but with a relative displacement in phase. If the displacement in phase be 180°, the effect will be that instead of being shaken the point to be welded is alternately pressed and relieved from both sides, the normal electrode pressure or the surface pressure exerted by the electrodes being, of course, superimposed this alternating pressure.

By suitably controlling the sound transmitters, which can be done without difficulty by the means provided by the current art, it is, of course, also possible to adjust any other displacement in phase between the sound transmitter of the upper side and the sound transmitter of the lower side, it being quite possible that the optimum effect may be obtained in special cases by a displacement in phase ranging between 0 and 180°.

It will be evident that many types of sound or ultra-sound emitters may be used in the arrangement according to the present invention, for example, the transmitter or transmitters used may operate according to the magneto-strictive or to the piezo-electric system.

What I claim is:

1. The method of welding a plurality of work pieces which includes the steps of applying to said work pieces through a plurality of electrodes simultaneously an electric current and a vibratory mechanical pressure of constant amplitude and of a frequency corresponding at least to the higher range of audible frequencies.

2. The method of welding a plurality of work pieces comprising applying to said work pieces through a plurality of electrodes simultaneously an electric current and a vibratory mechanical pressure of constant amplitude and of a frequency corresponding at least to the higher range of audible frequencies, and exerting a compression by said vibratory mechanical pressure and an alternating bending moment upon said work pieces.

3. In an electric resistance welding apparatus, in combination, a supply electrode, a return electrode and a sound transmitter adapted to a frequency corresponding at least to the higher range of audible frequencies surrounding said electrode.

4. In an electric resistance welding apparatus, in combination, a plurality of electrodes and ultra-sound transmitters adapted to a frequency corresponding at least to the higher range of audible frequencies, each of said transmitters surrounding one of said electrodes.

FRITZ HENTZEN.